C. W. SVENSON.
DRIVING MECHANISM FOR SPEEDOMETERS.
APPLICATION FILED DEC. 10, 1921.

1,404,067.

Patented Jan. 17, 1922.

Inventor
CHARLES W. SVENSON
By his Attorneys

C. W. SVENSON.
DRIVING MECHANISM FOR SPEEDOMETERS.
APPLICATION FILED DEC. 10, 1921.
1,404,067.
Patented Jan. 17, 1922.
2 SHEETS—SHEET 2.
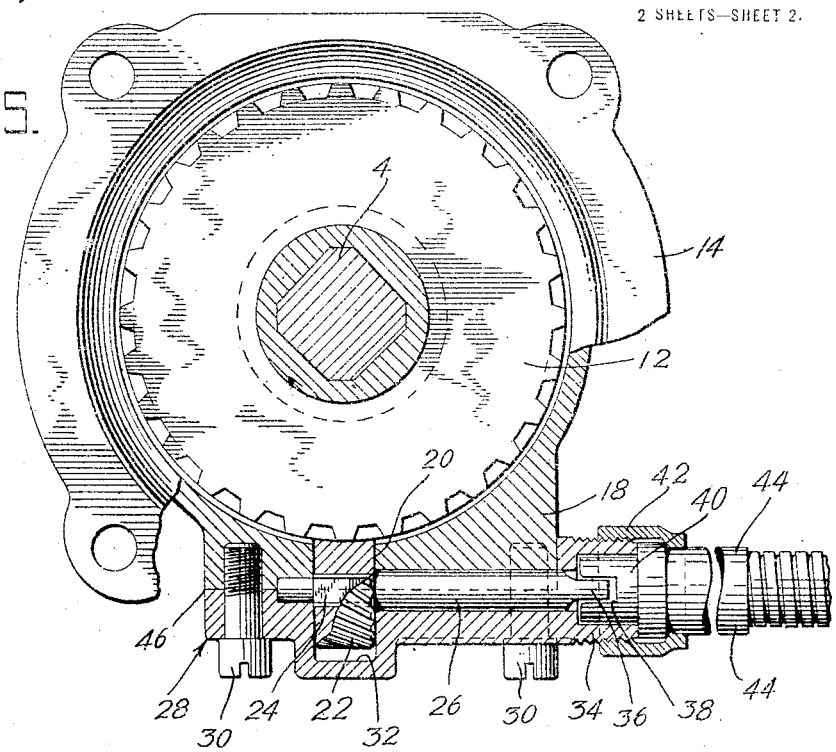
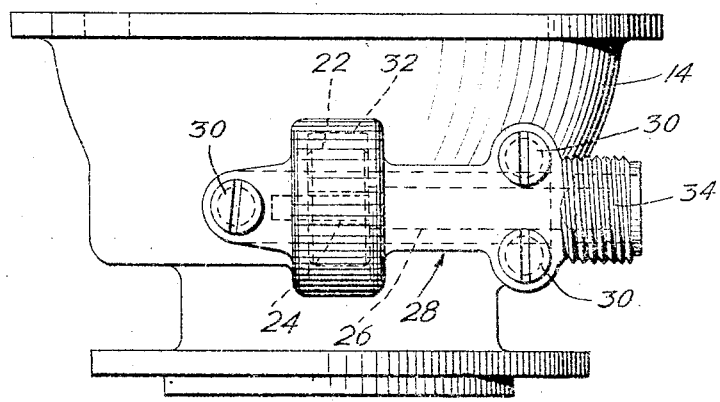
Inventor
CHARLES W. SVENSON.
By his Attorneys

UNITED STATES PATENT OFFICE.

CHARLES W. SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

DRIVING MECHANISM FOR SPEEDOMETERS.

1,404,067.  Specification of Letters Patent.  Patented Jan. 17, 1922.

Application filed December 10, 1921. Serial No. 521,336.

*To all whom it may concern:*

Be it known that I, CHARLES W. SVENSON, a citizen of the United States, residing at New Britain, county of Hartford, State of Connecticut, have invented a certain new and useful Improvement in Driving Mechanism for Speedometers, of which the following is a full, clear, and exact description.

The present invention relates to driving mechanisms which are particularly adapted for speedometers and other indicating devices that may be mounted on the instrument board of an automobile.

The object of the invention is to improve driving mechanisms of this character as will hereinafter appear.

The several features of the invention will be clearly understood from the following description and accompanying drawings, in which—

Fig. 5 is a sectional view taken on the line 5—5 of Fig. 1; and

Fig. 6 is a detailed bottom plan view of the portion of the construction illustrated in Fig. 5 but with certain parts removed.

Figure 1:
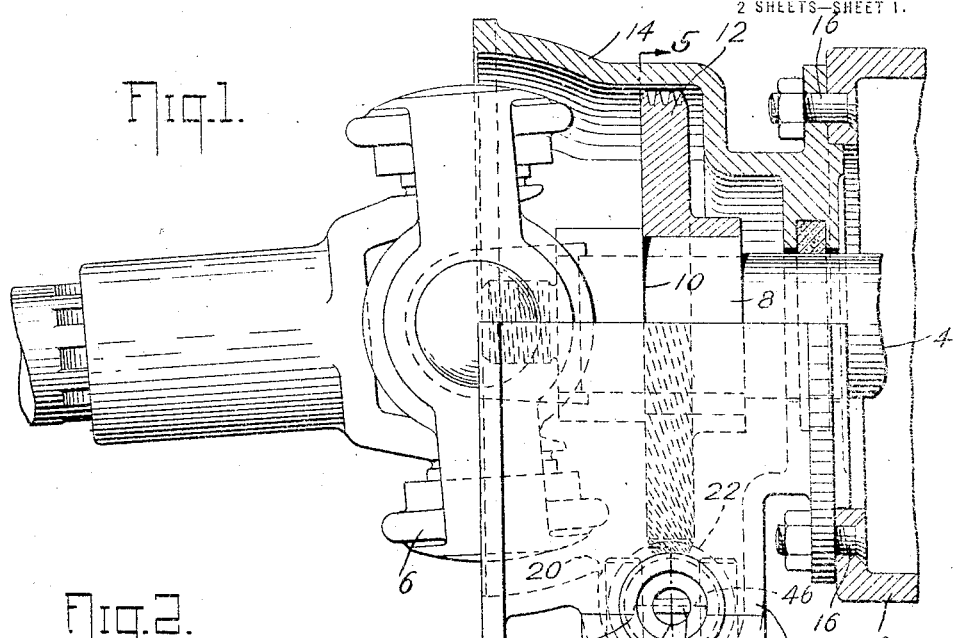
Figure 1 is a vertical sectional elevation of a portion of the transmission mechanism of an automobile with an instrument driving mechanism connected therewith embodying the features of the invention in their preferred form.
Figure 2:
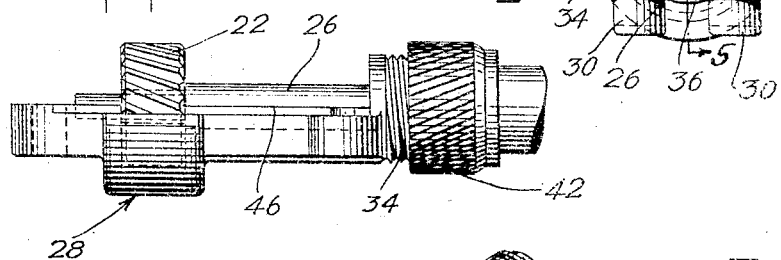
Fig. 2 is a detailed side elevation of a portion of the driving mechanism.
Figure 3:
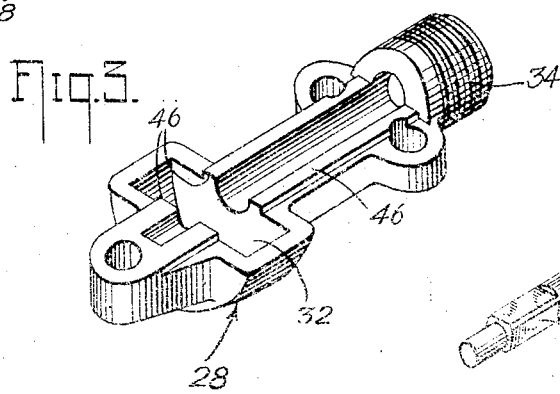
Figs. 3 and 4 are detailed perspective views of component parts of the portion of the mechanism illustrated in Fig. 2.
Figure 4:
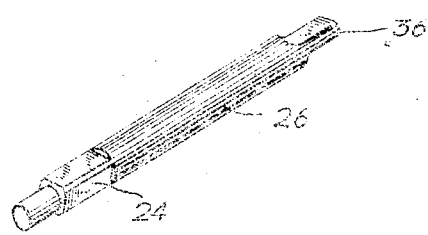

In the construction illustrated in the drawings a portion of the housing for the transmission mechanism of an automobile is indicated at 2, and the driving shaft at 4 which consists of two sections having the usual universal joint connection 6 between them.

In the construction shown the forward portion 8 of the member of the universal joint connection 6 which is mounted on the forward section of the driving shaft is reduced in diameter forming a shoulder 10. A spiral gear 12 is mounted on said reduced portion 8 against the shoulder 10, the spiral gear having a driving fit engagement with said reduced portion so as to be carried by the driving shaft. The spiral gear 12 and the universal joint connection are enclosed by the usual spherical housing, one part 14 of which is secured by bolts 16 to the transmission housing 2. The housing 14 is provided with a downwardly projecting portion 18 and the lower end of the housing is provided with an opening 20 which extends through the projecting portion 18. A spiral pinion 22 lying in the plane of the shaft 4, extends through the opening 20 and operatively engages the spiral gear 12. The spiral pinion 22 is removably mounted on a squared portion 24 of shaft 26 that extends transversely of the driving shaft 4. A cap 28 is secured by cap screws 30 to the face of the projecting portion 18 of the housing 14. The cap is provided with a pocket 32 which registers with the opening 20 in the housing 14 and receives the lower portion of the spiral pinion 22, the spiral pinion being held from axial movement by the engagement of the sides thereof with the side walls of the opening 20 and the pocket 32. The engaging faces of the projecting portion 18 of the housing and the cap 28 are provided with registering semi-cylindrical grooves that cooperate to form a bearing for the pinion shaft 26. The right hand end of the cap 28, viewing Fig. 5, projects beyond the projecting portion 18 and is in the form of a sleeve or hollow nipple 34. A tongue 36 is formed on the right hand end of the pinion shaft 26 which tongue projects into said nipple and engages a slot 38 in the end of a flexible shaft 40 extending into the outer end of the nipple 34. The end of the flexible shaft 40 is held in the nipple 34 by means of a coupling 42 having one end screw-threaded on the exterior of the nipple and its other end connected with the casing 44 of the flexible shaft in the usual manner. To assist in properly positioning the cap 28 on the projection 18 of the housing 14, and to assist the cap screws 30 in securely holding the cap in position, the cap and projection are provided with a tongue and groove connection 46 extending longitudinally of the cap, and the upper portion of the inner end of the nipple 34 abuts against the side of the projection 18. The pocket 32 of the cap 28 extends below the spiral pinion 22 to provide a space between the lower end of the pinion and the lower wall of the pocket.

With this construction it will be apparent that the cap 28, spiral pinion 22, shaft 26, and the end of the flexible shaft and its casing may be readily removed as a unit from the housing 14 without disturbing the other parts of the mechanism by merely removing the cap screws 30, and that these parts may be readily replaced. It will also be apparent that as the pinion 22 is located directly below the driving shaft of the automobile and at the lowest point of the housing 14, and a space is provided in the pocket 32 below the pinion 22, lubricating oil from the housing 14 will freely gravitate into the pocket from the housing, and thus the pinion and spiral gear will be maintained properly lubricated. Also, as the pinion shaft 26 is arranged in a horizontal plane the oil will freely work from the pocket 32, through the bearing for the pinion shaft and into the nipple 34 so as to maintain these parts and the connection with the end of the flexible shaft and casing properly lubricated. In case the spiral gears should become worn with use, this may be readily compensated for by suitably planing off the engaging faces of the cap 28 and the projection 18, and then again reaming the registering grooves in these parts so as to fit the pinion shaft. In a similar manner the construction may be adapted to employ a smaller spiral pinion for the purpose of changing the gear ratio. The construction may be adapted to employ a larger spiral pinion by substituting a cap of greater depth in which the entire bearing for the pinion shaft may be formed.

While it is preferred to employ the specific construction and arrangement of parts illustrated and described, it is to be understood that this construction and arrangement is not essential except so far as specified in the claims.

What I claim is:

1. The combination with the driving shaft of an automobile, having a universal joint connection, of a housing for the universal joint connection having an opening in its lower side, a spiral gear mounted on said driving shaft within said housing, a spiral pinion extending through said opening in the housing and engaging said spiral gear, a horizontal shaft for the pinion arranged transversely to said driving shaft, a cap removably secured to the housing providing a bearing for said pinion shaft and having a pocket opposite the opening in said housing to receive the lower portion of said spiral pinion and constructed to provide a space beneath said pinion to receive lubricating oil from the housing, and a flexible shaft having one end connected with said pinion shaft and supported by one end of said cap, said pinion shaft, pinion and cap being removable as a unit.

2. The combination with the driving shaft of an automobile, of a spiral gear carried by the shaft, a housing enclosing the spiral gear and having an opening in its lower side, a spiral pinion extending through said opening and engaging said gear, a shaft on which the pinion is mounted arranged transversely to said driving shaft, a cap removably secured to the housing and having a pocket below said opening and enclosing the lower portion of said pinion, and a flexible shaft connected with the pinion shaft.

3. The combination with the driving shaft of an automobile, of a spiral gear carried by the shaft, a housing enclosing the spiral gear and having an opening in its lower side, a spiral pinion extending through said opening and engaging said gear, a shaft for said pinion, arranged transversely to said driving shaft, a cap having a pocket registering with said opening in the housing and enclosing the lower portion of said pinion, said pinion being held from axial movement by the engagement of the sides thereof with the side walls of said opening and pocket, and a flexible shaft connected with the pinion shaft.

4. The combination with the driving shaft of an automobile of a second shaft arranged transversely thereto, gears connecting the shafts, a housing enclosing the gear on the driving shaft, a cap removably secured to the housing having a grooved portion cooperating with a grooved portion of the housing to provide a bearing for said second shaft, and a flexible shaft connected with said second shaft.

5. The combination with the driving shaft of an automobile, of a shaft arranged in a plane transverse to the plane of the driving shaft, a gear carried by the driving shaft, a pinion carried by said transverse shaft engaging said gear, a housing enclosing the gear on the driving shaft, a cap removably secured to the casing and having a grooved portion cooperating with a grooved portion of said housing to provide a bearing for said pinion shaft and having one end in the form of a tube projecting beyond the housing, and a flexible shaft having one end mounted in said projecting end of the cap.

CHARLES W. SVENSON.